(12) United States Patent
Chinthakindi

(10) Patent No.: US 6,906,905 B1
(45) Date of Patent: Jun. 14, 2005

(54) MICRO ELECTRO-MECHANICAL VARIABLE CAPACITOR

(75) Inventor: Anil K. Chinthakindi, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/710,283

(22) Filed: Jun. 30, 2004

(51) Int. Cl.$^7$ ................................................ H01G 5/00
(52) U.S. Cl. ..................... 361/277; 361/278; 361/290; 361/299.3
(58) Field of Search ................................ 361/277, 278, 361/280, 290, 292, 299.3, 298.2; 200/181, 600

(56) References Cited

U.S. PATENT DOCUMENTS

| | | | | |
|---|---|---|---|---|
| 6,275,034 B1 | * | 8/2001 | Tran et al. | 324/252 |
| 6,633,260 B2 | * | 10/2003 | Paschen et al. | 343/700 MS |
| 6,649,852 B2 | * | 11/2003 | Chason et al. | 200/181 |

* cited by examiner

Primary Examiner—Anthony Dinkins
(74) Attorney, Agent, or Firm—H. Daniel Schnurmann

(57) ABSTRACT

A three-dimensional micro electro-mechanical (MEMS) variable capacitor is described wherein movable comb electrodes of opposing polarity are fabricated simultaneously on the same substrate are independently actuated. These electrodes are formed in an interdigitated fashion to maximize the capacitance of the device. The electrodes are jointly or individually actuated. A separate actuation electrode and a ground plane electrode actuate the movable electrodes. The voltage potential between the two electrodes provides a primary mode of operation of the device. The variation of the sidewall overlap area between the interdigitated fingers provides the expected capacitance tuning of the device. The interdigitated electrodes can also be attached on both ends to form fixed-fixed beams. The stiffness of the electrodes is reduced by utilizing thin support structures at the ends of the electrodes. The three dimensional aspect of the device avails large surface area. Large capacitance variation and tuning ranges are obtained by independent actuation of the electrode fingers. A plurality of modes of operation of the device provides wide flexibility and greater performance advantage for the device. Upon fabrication of the device, a separate substrate with etched dielectric is used to encapsulated the device. The MEMS device is then completely encapsulated, requiring no additional packaging of the device. Further, since alignment and bonding can be done on a wafer scale, an improved device yield is obtained at a lower cost.

25 Claims, 16 Drawing Sheets

MICRO ELECTRO-MECHANICAL VARIABLE CAPACITOR

CROSS-REFERENCE TO RELATED APPLICATIONS

This application is related to U.S. Patent application Ser. No. 10/710,286, Elastomeric Micro Electromechanical Varactor, filed concurrently, and which is incorporated herein by reference.

BACKGROUND OF INVENTION

This invention is generally related to micro-electromechanical system (MEMS) devices, and more specifically, to a variable capacitor that uses three-dimensional comb-drive electrodes which can be integrated into current state of the art semiconductor fabrication processes.

Variable capacitors or varactors play a fundamental role in high-frequency and radio-frequency (RF) circuits. In the last few years, MEMS variable capacitors have drawn considerable interest due to their superior electrical characteristics.

While variable capacitors using MEMS technology can be readily implemented in standard semiconductor devices for applications in aerospace, consumer electronics and communications systems, researchers have attempted to improve the tuning range of MEMS variable capacitors since the maximum capacitance tuning range achieved by parallel plate electrodes is limited. This is due to the non-linear electrostatic forces involved during actuation. Parallel plate electrodes exhibit a typical "pull-down behavior" at one-third the gap distance, leading to a maximum tuning capacitance of 1.5. Most previous approaches have resulted in an increased processing complexity and/or a large number of moving parts, leading to a drastic reduction in reliability. Additionally, packaging MEMS devices and integrating them into CMOS integrated circuits pose great challenges.

A. Dec et al., in an article entitled "RF micro-machined varactors with wide tuning range", published in the IEEE RF IC Symposium Digest, pp. 309–312, June 1998, describe the construction of a MEMS variable capacitor by actuating a movable electrode using two parallel electrodes above and below the movable electrode. The total capacitance tuning range is significantly enhanced as a result of the individual capacitance between the movable-top and movable-bottom being in series. The maximum tuning range achievable using this approach is a ratio of 2:1. A. Dec et al. report achieving a tuning range as high as 1.9:1. Even though the tuning range significantly improves when using this approach, the process complexity increases correspondingly to a level that significantly reduces their utility for industrial applications.

U.S. Pat. No. 6,661,069 describes a method of fabricating a micro electro mechanical varactor using comb-drive electrodes as actuators. This approach is intended to increase the tuning range, but its construction, as described, involves fabricating the device on two separate substrates. The primary mode of actuation resides between the fin structures within the device. Further, the device is a three-port varactor and does not offer multiple actuating modes for enhancing the tuning range of the device.

In view of the foregoing considerations, there is a distinct need in industry for variable capacitors which construction differs considerable from the parallel plate devices and which method of fabrication differs from the conventional methods previously discussed. In particular, what is required are movable comb-drive electrodes for capacitance sensing and separate actuation electrodes for actuation of the movable comb drive electrodes. Preferably, the capacitance should vary by actuating one or more of the electrode fingers, thereby varying the overlap area between the comb electrodes. The capacitance tuning range of such device requires to be greatly enhanced by taking full advantage of multiple modes of actuation if possible in such devices. Since multi-port capacitors are required (i.e., at least two ports for DC bias and two ports for the RF signals), the signal capacitance should not require decoupling as is the case in conventional three-port varactors. The device should further be fabricated using standard semiconductor fabrication techniques and allow for an easy integrated into semiconductor circuits.

Accordingly, it is an object of the invention to provide a MEMS variable capacitor that utilized multi-fingered inter-digitated three dimensional comb drive electrode for sensing, while the control or actuation electrodes drive the motion of the movable comb drive electrode beams either individually or all in unison, leading to changes in capacitance. It is another object to provide a MEMS varactor wherein the switch contacts are separated by a dielectric to provide electrical insulation between the ground electrode and the actuation electrode.

It is further an object to provide a MEMS variable capacitor with comb-drive electrode sensing for obtaining large capacitance ratio or tuning range.

It is yet another object to configure a plurality of MEMS variable capacitors in a variety of three-dimensional configurations.

It is still another object to provide a MEMS varactor having controlled stress gradient in the comb-drive electrode fingers leading to large change in overlap area.

It is still another object to provide a MEMS variable capacitor wherein the number and type of support structures to the movable comb drive fingers vary to lower the drive voltages.

It is still a further object to provide a method of fabricating a MEMS variable capacitor using manufacturing techniques that are compatible with applicable to CMOS semiconductor devices, which allows fabricating and packaging the MEMS device simultaneously and reduces the number of fabrication steps to a minimum while reducing the cost of processing.

SUMMARY OF INVENTION

MEMS based variable capacitors provide many advantages over conventional solid-state varactors. These devices operate at higher quality factors leading to low loss during operation. Two types of MEMS varactors are described herein: parallel plate and comb-drive varactors.

Most widely investigated MEMS varactors are parallel plate capacitors with a movable electrode and a fixed electrode. The major disadvantage when using these MEMS devices is the limited tuning range of operation obtained upon actuation of these devices. The inherent electromechanical aspects involved restrict the tuning range and lead to snap down of the movable electrode. This is often referred to as the "pull-down instability effect". Electrostatic forces acting on the movable electrode are non-linear in nature, causing this effect. On the other hand, in the comb-drive electrodes, the electrostatic forces acting on the movable electrode are linear (i.e., directly proportional to the distance) which greatly enhances the tuning range. However, comb-drive electrodes are difficult to process and the change in capacitance obtained is very small (due to less area available).

In one aspect of the invention, the MEMS variable capacitor described includes both of the approaches, i.e., parallel plate and comb-drive capacitors that were thus far considered. A greater area is made available during tuning by fabricating a three-dimensional multi-layered electrodes in a comb-drive configuration. The non-linear electrostatic forces from the parallel plate approach are utilized to provide independent or simultaneous actuation to the comb drive electrodes. The movable and fixed electrodes are processed sequentially on a single wafer. The intrinsic stress gradient in the film stack, metal layer and the metal interconnections is used to form curved beams of controlled topography. Devices having separate DC ports for actuation and RF ports for sensing are formed using this configuration, the RF (signal) electrodes being formed by the comb drive electrodes, and the actuator electrodes formed underneath the movable electrodes, provide actuation to the movable beams. The ground plane electrode is electrically isolated from the sensing comb-drive electrodes by lack of inter-level vias.

After completion of the processing and release of the MEMS variable capacitor, the device is advantageously packaged and encapsulated in dielectric by utilizing a second carrier wafer with trenches and precision aligning to completely cover the released MEMS structure. The height of the trench on the carrier wafer is determined by the maximum tip deflection of the movable comb drive electrode. Finally the device is encapsulated with polymeric material in order to provide controllable environment for the MEMS device during operation.

In a second aspect of the invention, the actuation electrodes underneath the movable comb-drive electrodes are combined to provide a single actuation for all the electrodes having the same polarity. The electrodes with opposite polarity are separately actuated. The inventive variable capacitor operates under four modes of actuation, thereby leading to a change in capacitance in each of the four modes.

In a third aspect of the invention, the actuation electrodes underneath the movable comb-drive electrodes are individually actuated for electrodes having opposite polarity and, hence, they provide numerous states or modes of operation. For each of the modes, the capacitance of the device changes when compared to equivalent prior state devices. The capacitance tuning of the device is greatly enhanced by gradually stepping up the actuation for the device.

BRIEF DESCRIPTION OF DRAWINGS

These and other objects, aspects and advantages of the invention will be better understood from the detailed preferred embodiment of the invention when taken in conjunction with the accompanying drawings.

DETAILED DESCRIPTION

The present invention will now be described more fully, hereinafter with reference to the drawings, in which preferred embodiments are shown.

Figure 1:
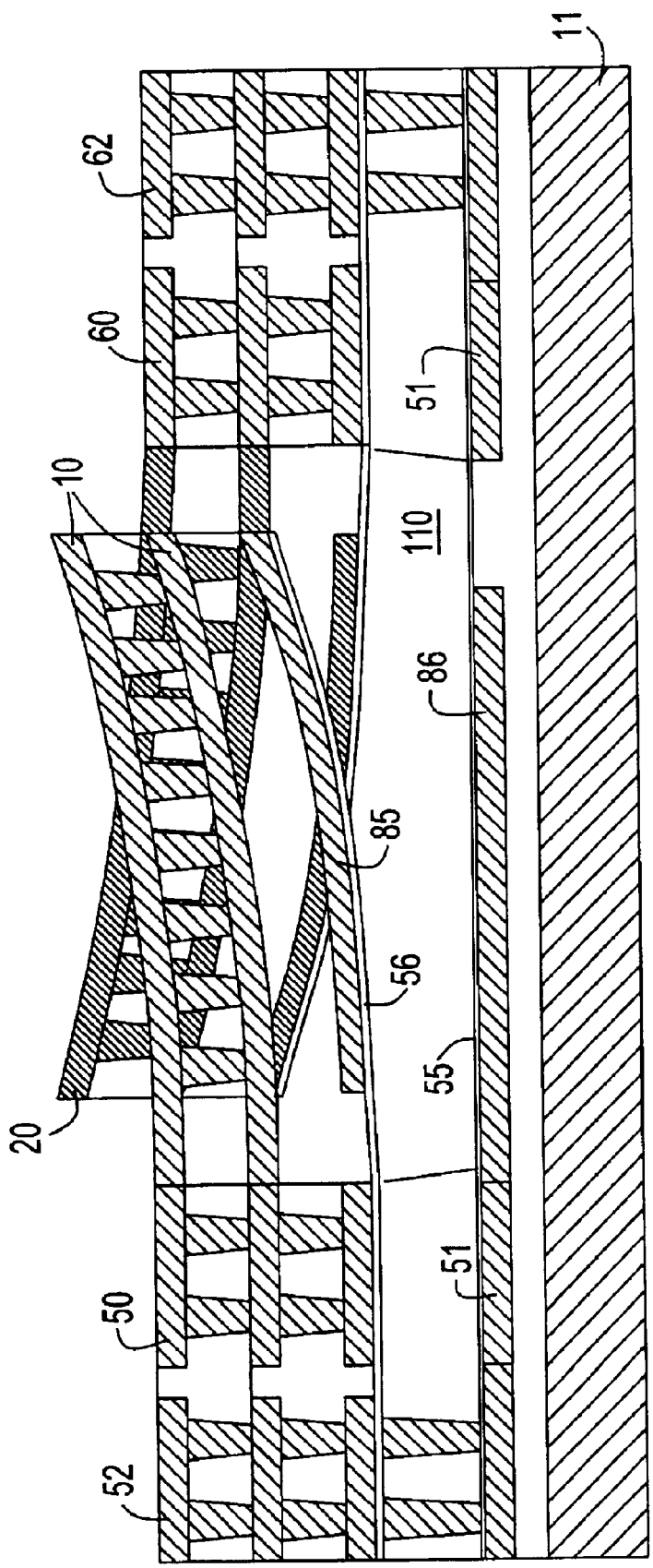
FIG. 1 is a cross-section view of the MEMS variable capacitor of the present invention depicting two interdigitated electrodes, positive and negative electrodes, seen at a cut through the lines A–A' shown in FIG. 2.

Referring to FIG. 1, there is shown a cross-section view of the three dimensional micro electro mechanical system (MEMS) variable capacitor according to the invention. The device is built on a substrate 11 upon which the movable beams 10 and 20 and fixed electrode 86 are sequentially fabricated, using conventional semiconductor fabrication techniques. The electrodes 10 and 20 are built in a comb-drive electrode configuration wherein one end of the comb-drive finger is attached while the other end is free to move. The two electrodes 10 and 20 are of opposing polarity and form the two electrodes of a capacitor. The capacitance between the two electrodes is determined by the overlap sidewall area between the two electrodes and finger spacing between the electrodes. The electrodes 10 is preferably made of a multi-layered metallization connected with inter-metal via connections. The bottom electrode, 85 of the movable comb drive finger acts as the ground plane electrode for the actuation electrode 86. The electrodes 85 and 86 operate as parallel plate electrodes separated by air gap 110. A voltage potential applied between electrodes 86 and 56 generates the electrostatic force necessary to pull the comb-drive electrode 10 towards the substrate. This, in turn, produces a change in the overlap sidewall area between the electrode 10 and 20, leading to a change in capacitance between the two finger structures. The ground plane electrode 85 and actuation electrode 86 are electrically isolated by insulating layers 56 and 55. This isolation is required to avoid any electrical shorting between the electrodes 85 and 86 upon actuation. The movable electrodes 10 and 20 are attached to metal strap pads 50 and 60, respectively, which allow for sensing the capacitance of the device. The actuation electrode 86 is connected by way of metal pad 52 through the metal interconnections, offering simultaneous or individual actuation. Metal strap pads 50 and 60 are used as RF sensing pads, while the actuation metal pads 52 and 62 are used as DC actuation pads. The inventive varactor is illustrated only as a two level (i.e., tier) capacitor. Practitioners of the art will readily recognize that many other levels can be added to increase the amount of capacitance created by the capacitive device.

Figure 2:
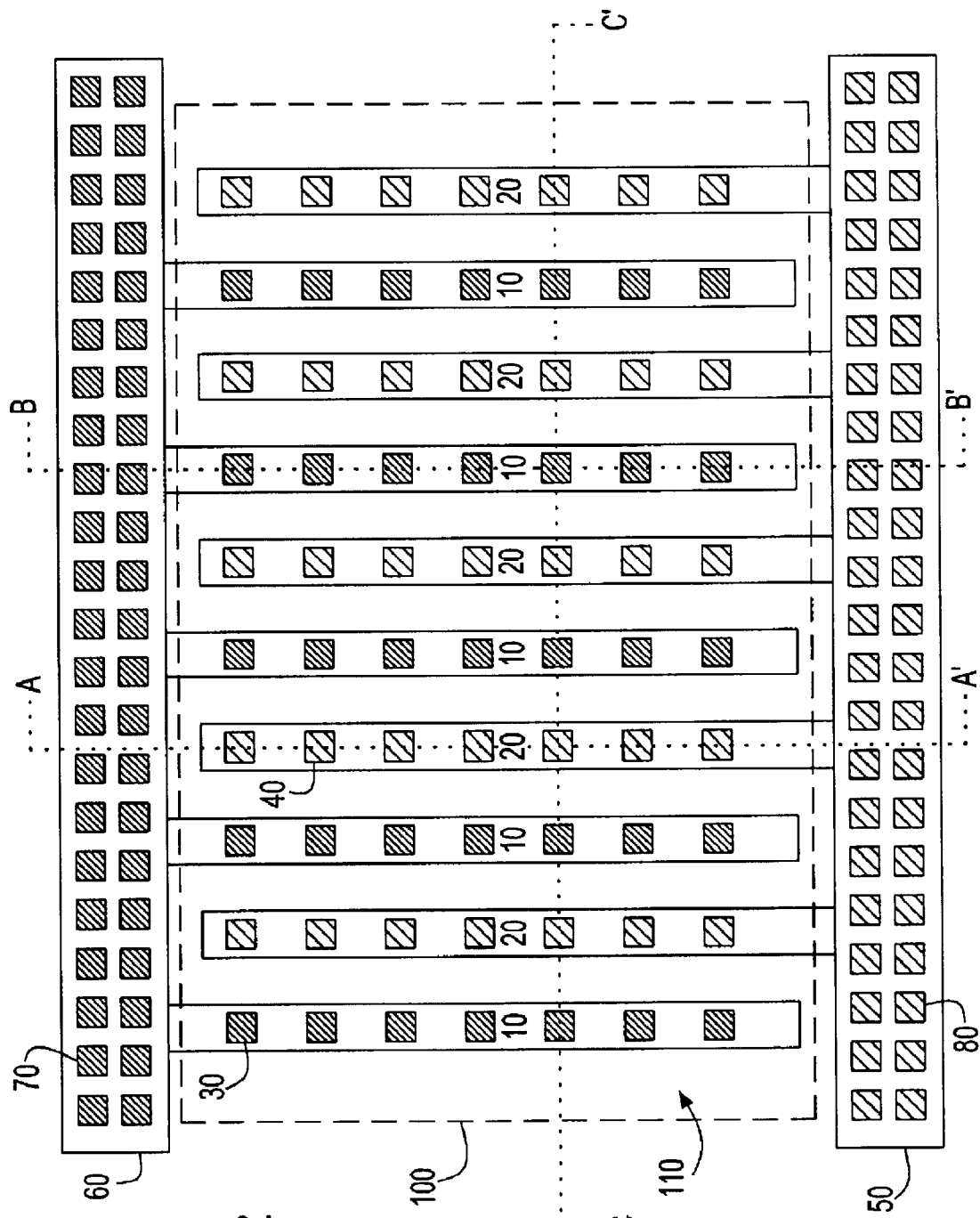
FIG. 2 is a top-down view of the functional MEMS variable capacitor in accordance with the present invention.

FIG. 2 is a top-down view of the functional MEMS variable capacitor. The device is formed by comb-drive electrodes separated from each other by a given space. The electrodes 10 and 20 span across the width of the capacitor. The length of the device is determined by the overlap length of the electrodes 10 and 20. The electrodes, forming the two electrodes of the MEMS variable capacitor 10 and 20 are of opposite polarity, and are electrically insulated. The gap separating the two electrodes 10 and 20 and the sidewall overlap area between the two electrodes determines the capacitance of the device. Electrodes 10 and 20 are formed in an comb-drive configuration, and are further connected by way of metal via connections 30 and 40 along the finger length. These metal via connections 30 and 40 are spaced at regular intervals along the length of the actuation electrode 10 and 20, to maximize the sidewall area of the comb electrodes. Metal vias interconnections 70 and 80 are placed across the width and length of the metal straps 60 and 50, respectively. The boundary defined by the shape 100 shows the cavity area with the air gap 110 in which the movable electrodes 10 and 20 are to be formed.

Figure 3:
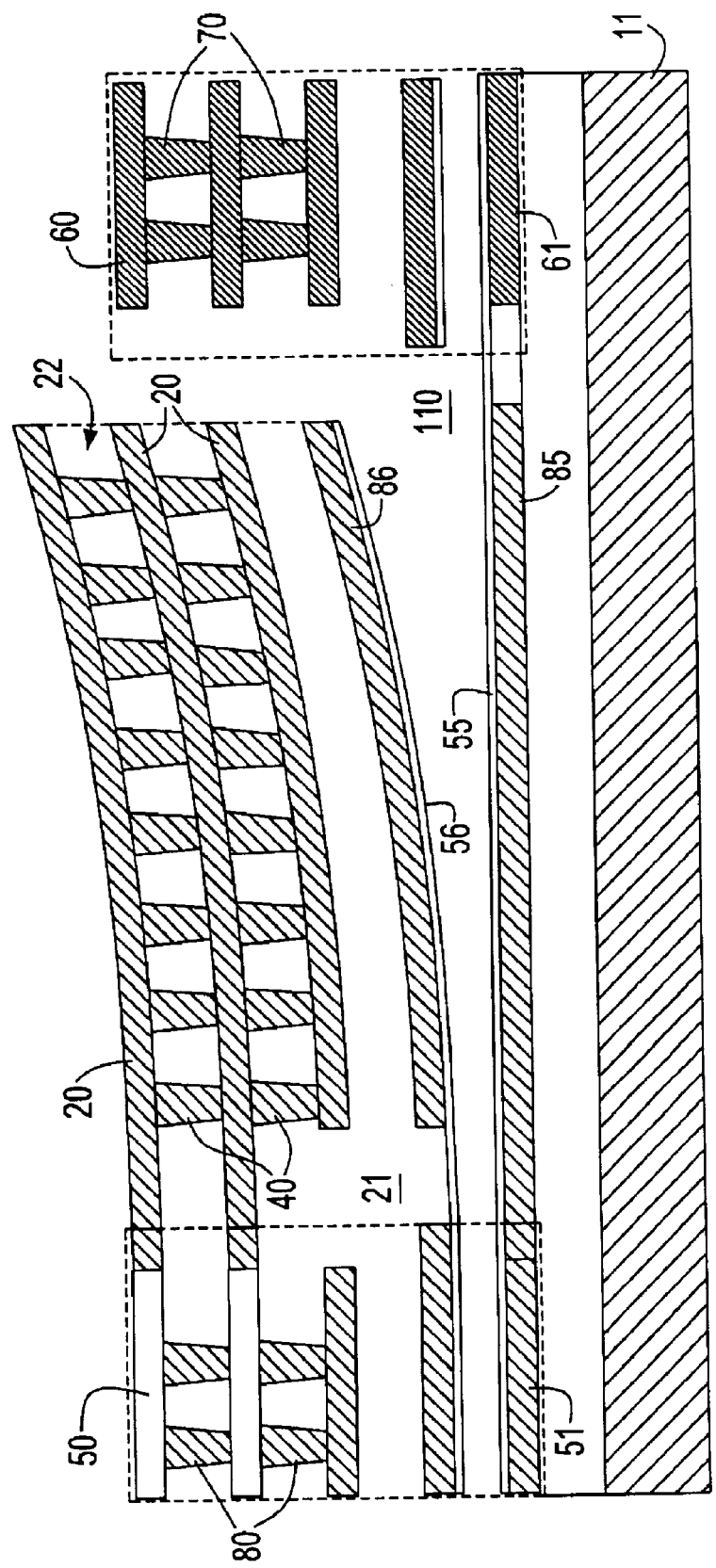
FIG. 3 is a cross-sectional view of the device shown in FIG. 1, seen at a cut through the lines A–A' shown in FIG. 1.

FIG. 3 shows a cross-section of the three-dimensional MEMS variable capacitor seen through a cut defined by line A–A' (see FIG. 2). The electrode 20 is formed by a plurality of multi-level metallization interconnected with via connections 40. The sidewall area of the capacitor is determined by the number of metallization lines and via interconnections. The capacitance of the device and its tuning is, in turn, determined by the sidewall area of the electrode. The movable electrodes 20, the via interconnections 40 and the ground plane electrode 86 are coplanar and are physically embedded in the same dielectric 21 defined by boundary 22. Further, the movable beam 20 and the ground plane electrode 86 are separated and are electrically insolated, with no metal via connections. Movable electrodes having similar polarity 20 are all connected to the adjacent metal structure 50, as shown in FIGS. 2 and 3. For simplicity, the metal structures 50 will be, henceforth, referred to as metal straps. The metal strap 50 is also connected by way of metal via connections 80. The movable electrodes, the ground plane electrodes and the metal strap are inserted within dielectric 21, as it is typically done in the semiconductor fabrication process commonly referenced as damascene process. The electrode structure is attached at one end and is free to move at the other end in an air gap cavity defined by region 110. The formation of cavity 110 is described in detail in U.S. Pat. No. 6,635,506, which is hereby incorporated in its entirety by reference.

In the preferred embodiment, the metal connections and electrodes are, preferably made of copper, with a suitable liner and barrier material, such as Ta, TaN, Ti, TiN, W, and the like. Each metal conductor in electrode 20 is approximately 5000 Å–8000 Å thick. Conductor 85 is illustrative of an actuation electrode, wherein the gap separating electrodes 85 and 86 determines the actuation voltage of the device.

Figure 4:
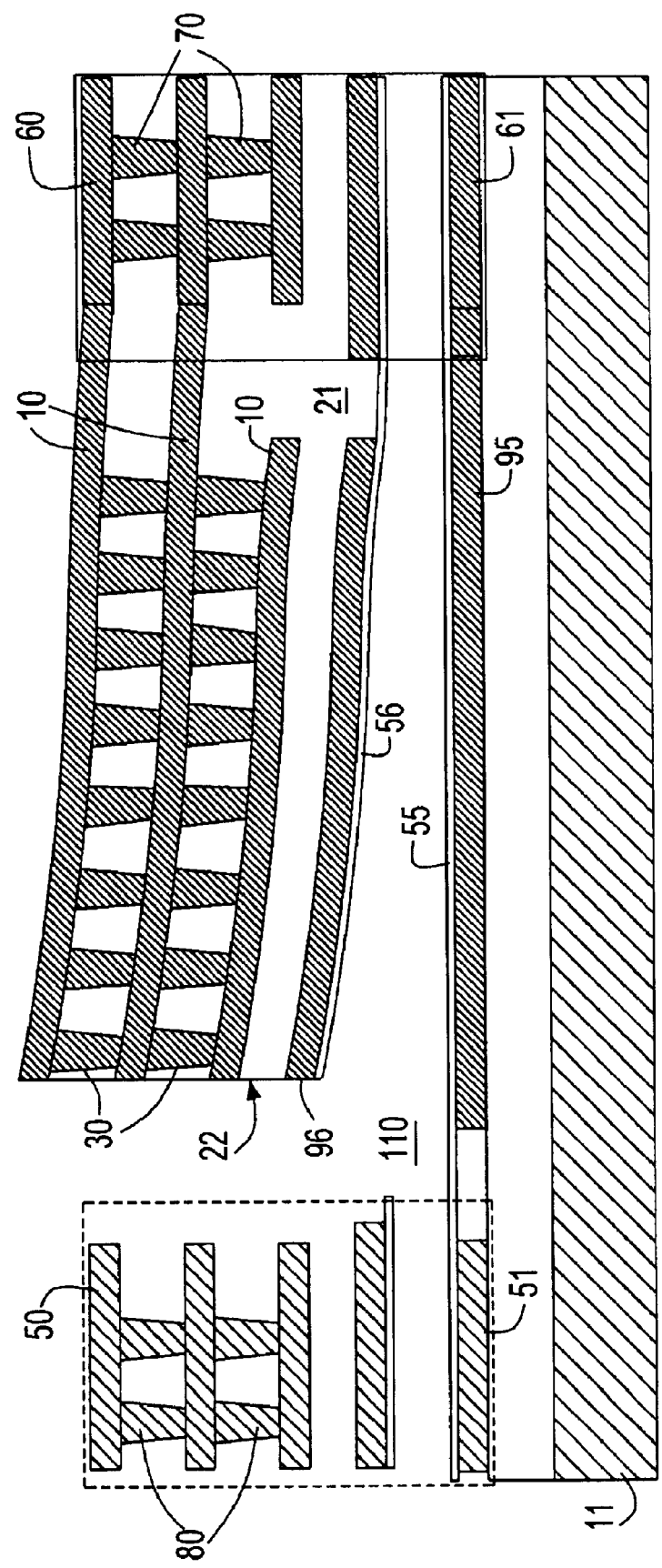
FIG. 4 is a cross-section view of the device shown in FIG. 1, seen at a cut through lines B–B' shown in FIG. 1.

A cross-section image as seen through section B–B' (see FIG. 2) depicting the structure of electrode 10 is shown in FIG. 4. This electrode is the other movable comb drive electrode which forms the second electrode of the capacitor. Similar to electrode 20, the metal layers in the movable electrode 10 are connected by metal via connections 30. They are also attached to adjacent metal structure 60, i.e., the metal strap for these electrodes. The metal levels in strap 60 are electrically connected using metal via connections 70. The via connections 30 are regularly spaced and are fully populated along the length of the actuation electrode 10 to maximize the sidewall area of the comb electrode 10. Similar to the other comb-drive electrode 20, the ground plane electrode 96 and metal layer 10 are electrically isolated, allowing no metal connections. Movable electrodes 10 and ground plane electrode 96 are formed within dielectric 21, as defined by boundary 22. The electrode 96 and actuation electrode 95 are electrically isolated by insulating layers 56 and 55, respectively.

Referring to FIG. 3 and FIG. 4, the overlap area of comb drive fins 10 and 20 varies significantly, typically of the order of 1,000 $\mu m^2$. The length of movable beams 10 and 20 (FIG. 2) varies, ranging from 20 $\mu m$ to over 200 $\mu m$. The actuation electrodes 95 and 85 (FIGS. 3 and 4) provide the necessary actuation, forcing them to maintain a vertical position relative the other comb drive electrode. The attractive force between actuation electrodes 95 and 96 depends on the overlapping areas of these metal surfaces and the gap distance between the two surfaces. The motion of these actuation electrodes is expected to follow the parallel plate electrode dynamics. The actuation electrodes 85 and 86 are expected to have similar motion and actuation voltages. The metal via connections 30 and 40 are provided with a sidewall area ranging from 0.5 to 2 $\mu m^2$. The total sidewall area of each electrode 10 and 20 ranges from 0.5 to 50 $\mu m^2$, although its dimensions may vary by making it deeper or longer in order to maximize the area of electrode 10. The change in sidewall overlap area between the electrodes 10 and 20 due to the actuation of the actuation electrodes 90 and 91 determines the capacitance variation of the MEMS device. The electrodes 10 and 20 are embedded in the dielectric 21 made of combination of dielectric films of $SiO_2$ and SiN. The insulating films 56 and 55 are typically made of SiN or SiCN, having a thickness ranging from 200 Å–700 Å. The initial curvature of the movable beams 10 and 20 is determined by the intrinsic stress and stress gradient along the thickness of the beam. It can be controlled by varying the deposition conditions and thicknesses of the beams material. For a beam material preferably made of copper, the deposition conditions, such as current density, bath conditions and temperature can be varied. In addition, the thickness of the associated liner material can be varied to control the initial curvature of the beam.

Figure 5:
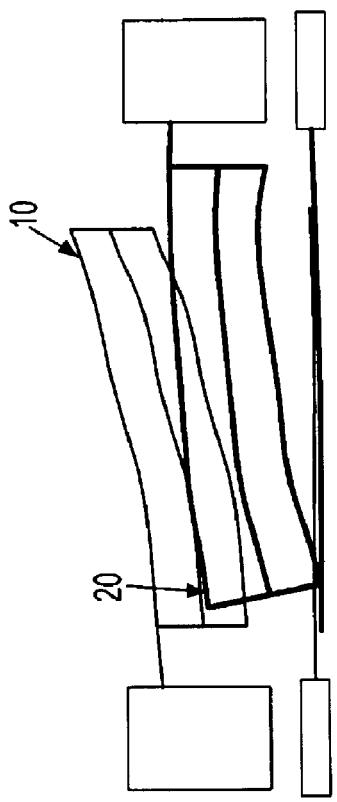
FIG. 5 shows a schematic cross-section view of the device at zero actuation (mode 1) of the device shown in FIG. 4.
Figure 6:
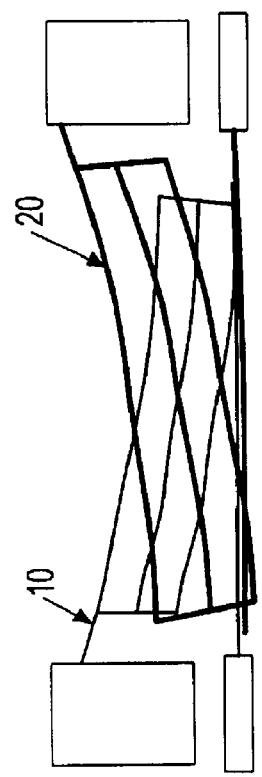
FIG. 6 shows a cross-section view of the device at actuation of the positive electrode (mode 2) of the device shown in FIG. 4.
Figure 7:
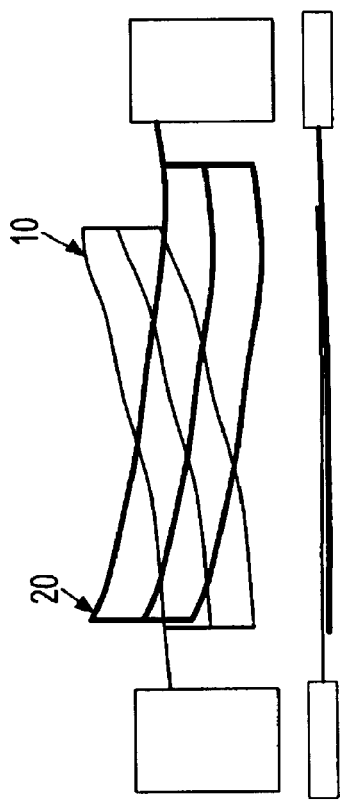
FIG. 7 shows a cross-section view of the device at actuation of the negative electrode (mode 3) of the device shown in FIG. 4.
Figure 8:
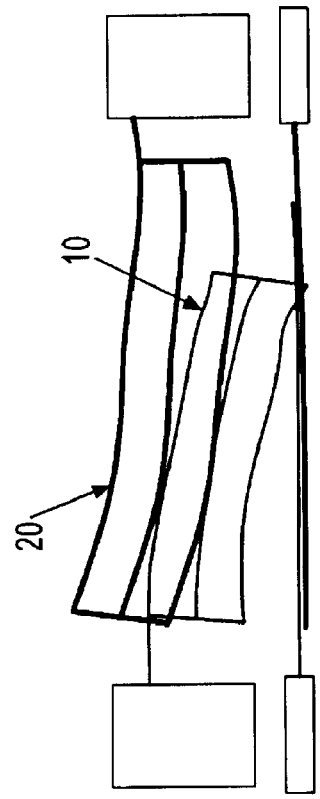
FIG. 8 shows a cross-section view of the device at actuation of both the positive and negative electrodes (mode 4) of the device shown in FIG. 4.

FIGS. 5–8 are schematic diagrams illustrating the four different modes of operation of the MEMS variable capacitor, wherein all the movable electrodes having the same polarity are simultaneously actuated. FIG. 5 shows the initial mode of operation of the device, in which the electrodes 10 and 20 are not actuated. This provides the initial capacitance of the device. FIG. 6 shows the state wherein the movable electrode 20 is fully actuated while the electrode 10 remains in its initial state. FIG. 7 shows the state wherein the electrode 10 is fully actuated and finally FIG. 8 shows the state wherein both the electrodes 10 and 20 are actuated. By stepping through each of the modes from the initial state, a change in sidewall overlap area is observed, which leads to a change in capacitance for the device.

Figure 9:
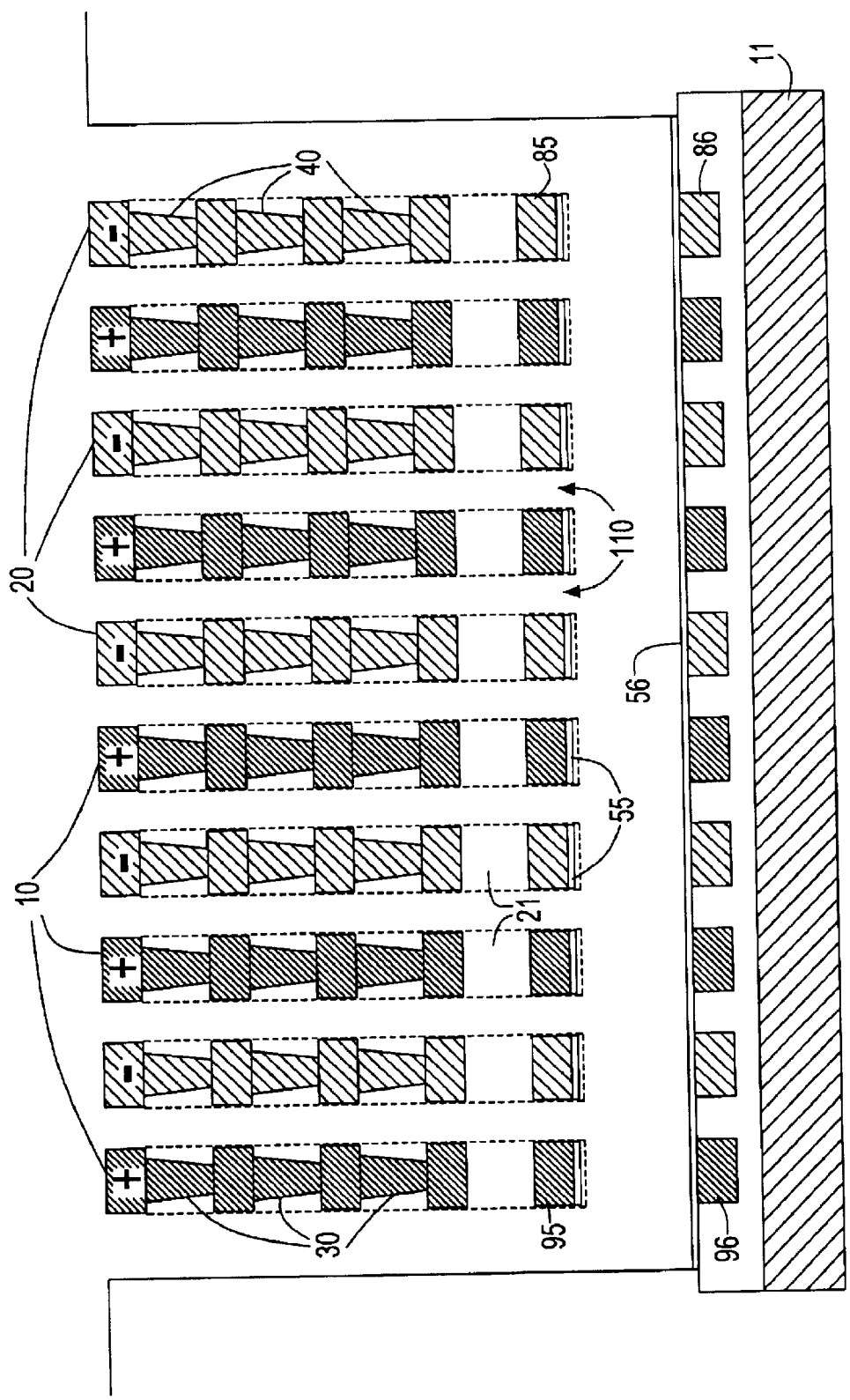
FIG. 9 is a cross-section view of the MEMS variable capacitor depicting multiple interdigitated electrodes, positive and negative electrodes, seen at a cut through the lines C–C' shown in FIG. 2.

FIG. 9 shows the cross-section view of the MEMS variable capacitor, as shown through section CC' of FIG. 2. The electrodes 10 and 20 are of opposing polarity and face each other. The presence of number of via connections 30 along the finger length of the electrode 10 provides an electrode in a vertical parallel plate configuration. The metal levels forming the electrode 10 and 20 are connected by vias 30 and 40, respectively. Further, these vias are aligned in order to maximize the overlap sidewall area. The electrodes are suspended by support structures at one end in the air gap cavity 110. The metal levels in electrode 10 and ground plane electrode 95 are embedded in the dielectric layer 21. The via connections 30 and 40 can be connected by an insulating dielectric or by a deformable elastomeric material that exhibits a large change in conductivity with a small amount of displacement. The presence of such a conducting elastomeric material not only increases significantly the mechanical reliability of the structure but also the overall sidewall area.

Figure 11:
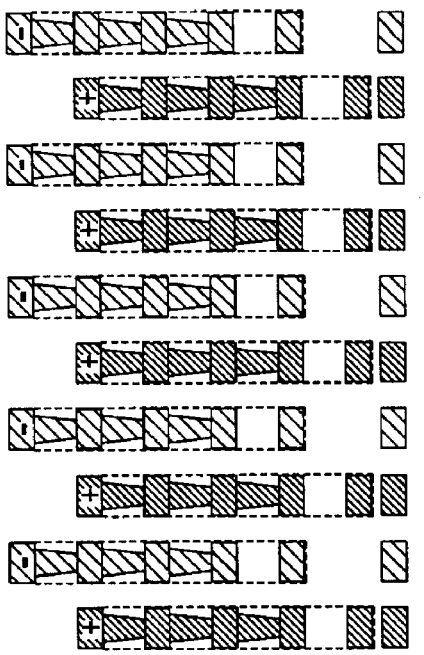
FIGS. 10–13 are cross-sectional views of the MEMS variable capacitor at actuation of all or some of the positive and negative electrodes, seen at a cut through the lines C–C' shown in FIG. 2.
Figure 13:
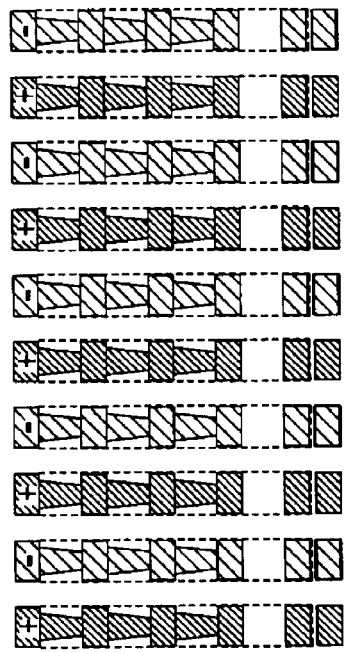
Figure 10:
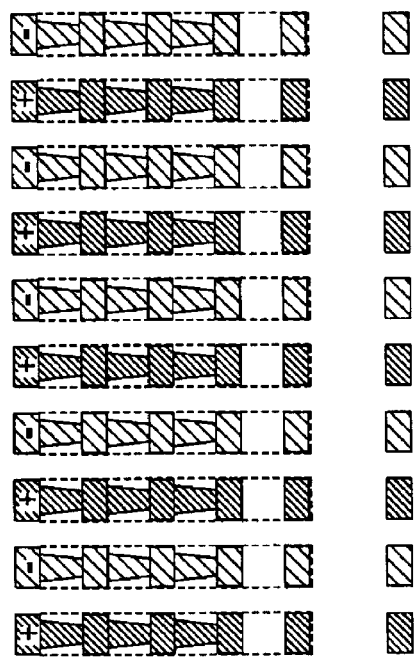
Figure 12:
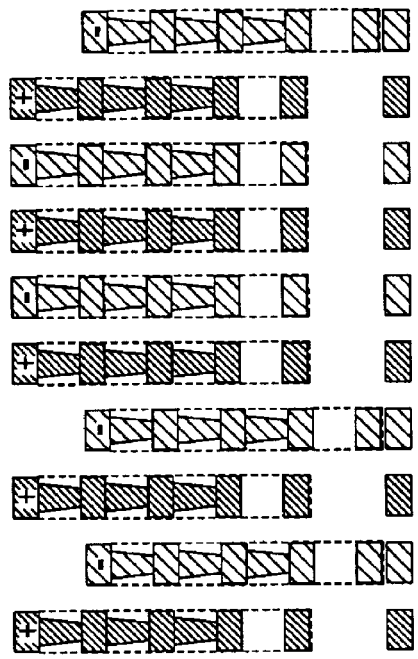

FIGS. 10–13 illustrate four different modes of operation of the device when the electrodes are independently actuated. FIG. 10 shows the initial state of the device, with the comb drive electrodes not actuated. FIG. 11 shows the state where the actuation electrodes corresponding to movable electrode 10 are actuated. FIG. 12 shows the state where the electrodes corresponding to movable electrode 20 are actuated. FIG. 13 shows the state where the electrodes corresponding to both the movable electrodes 10 and 20 are simultaneously actuated. Note that the four actuation modes depicted represent only some of the many different combinations of actuations that are possible for the capacitor. In each actuation state, the sidewall area between comb drive electrodes changes from its initial state. By way of example, when the device is actuated to the state shown in FIG. 11 from an initial state of shown in FIG. 10, a change in sidewall area of the capacitance is observed. Further, sequential actuation of the one or more of the electrodes produces a gradual increase or decrease in the overlap area and, correspondingly, on the capacitance.

Figure 14:
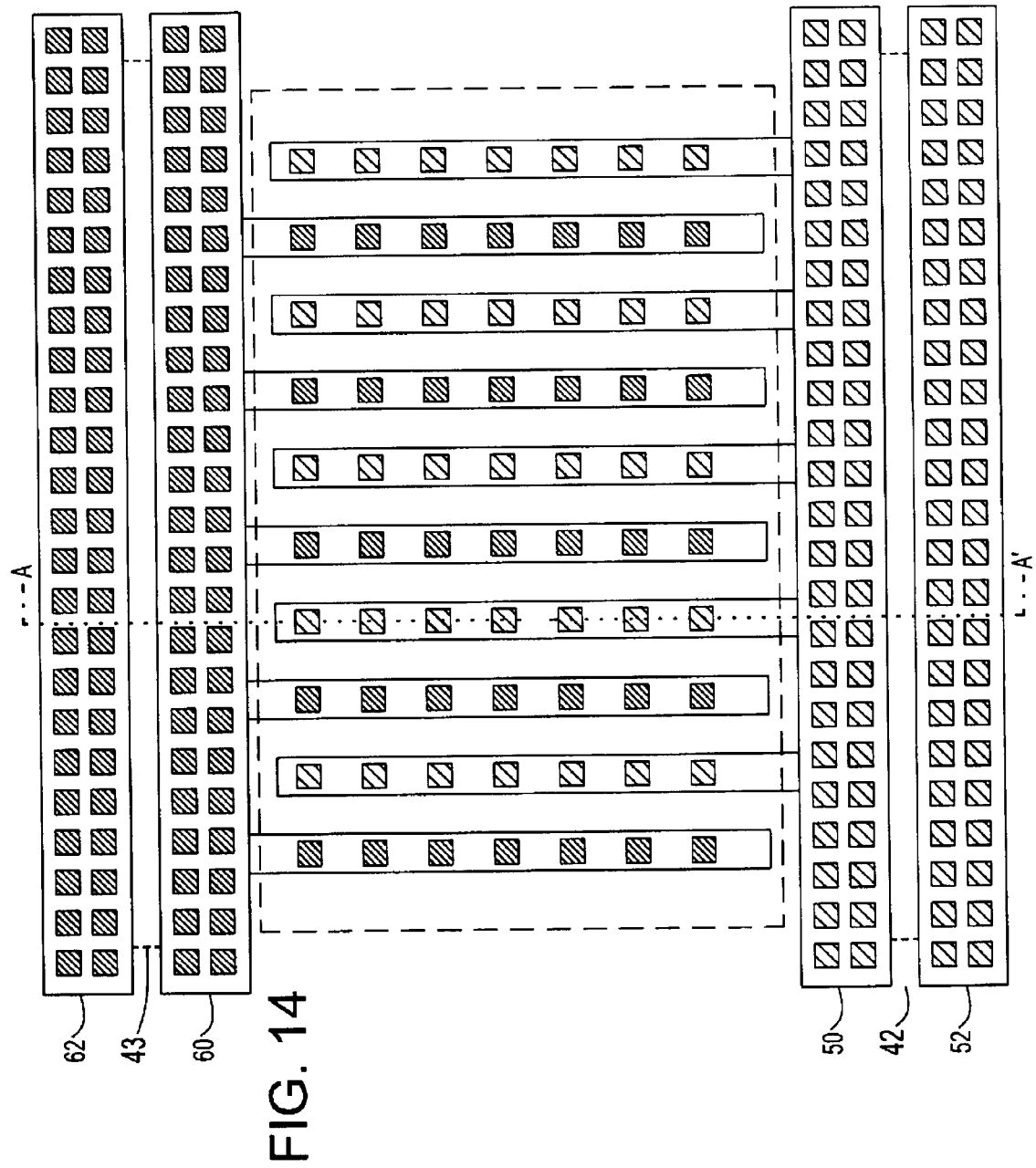
FIGS. 14–15 are top-down views of the device wherein actuation electrodes are attached to a single pad or separate actuation pads.
Figure 15:
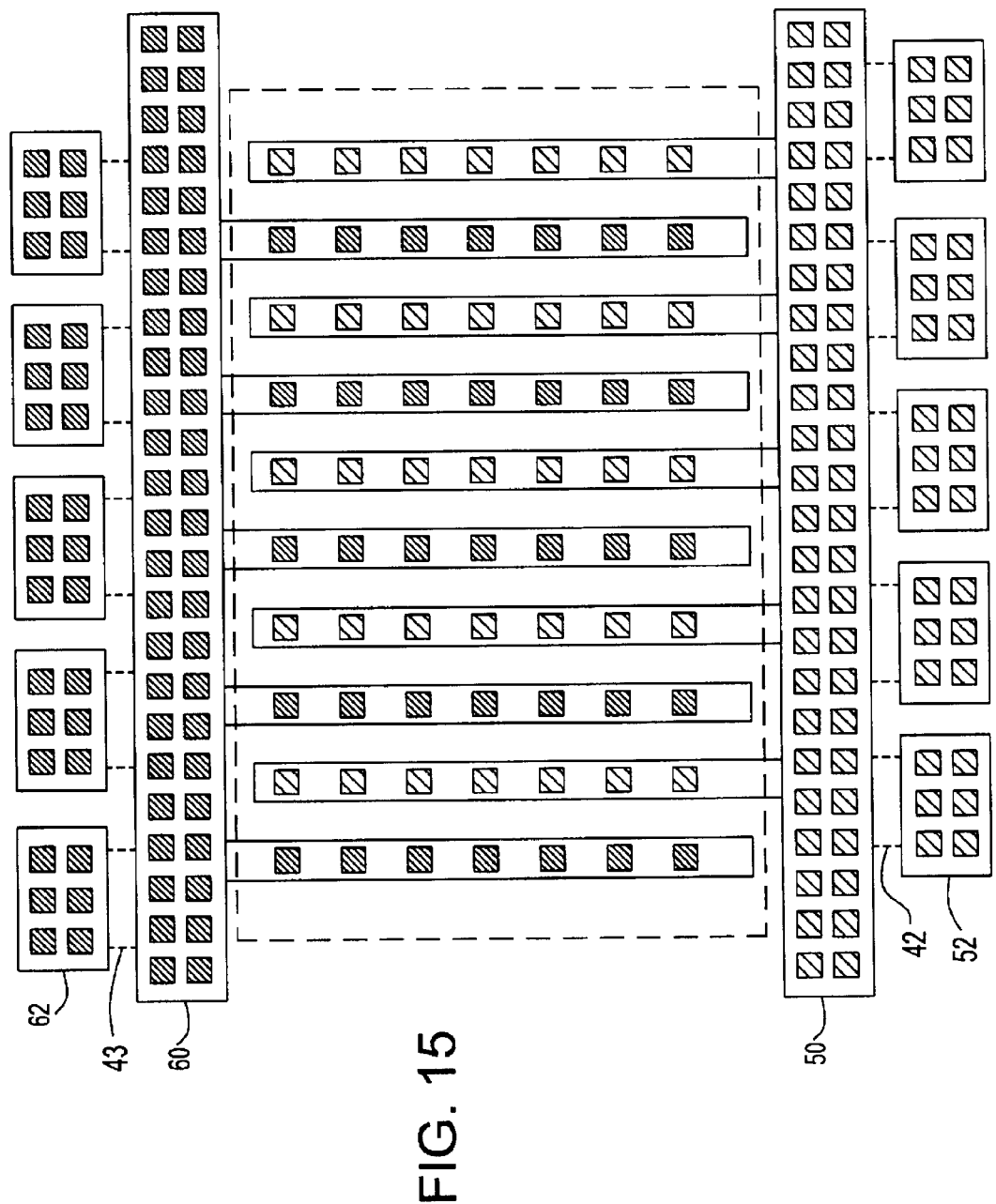

FIG. 14 is a top-down layout view of the MEMS variable capacitor with the actuation pads 52 and 62, wherein all the actuation electrodes are connected by way of interconnections 43 and 42, respectively. FIG. 15 shows a top-down layout view of the device, wherein the actuation electrodes for each of the comb drive electrodes are disconnected and ready to be actuated individually.

Figure 16:
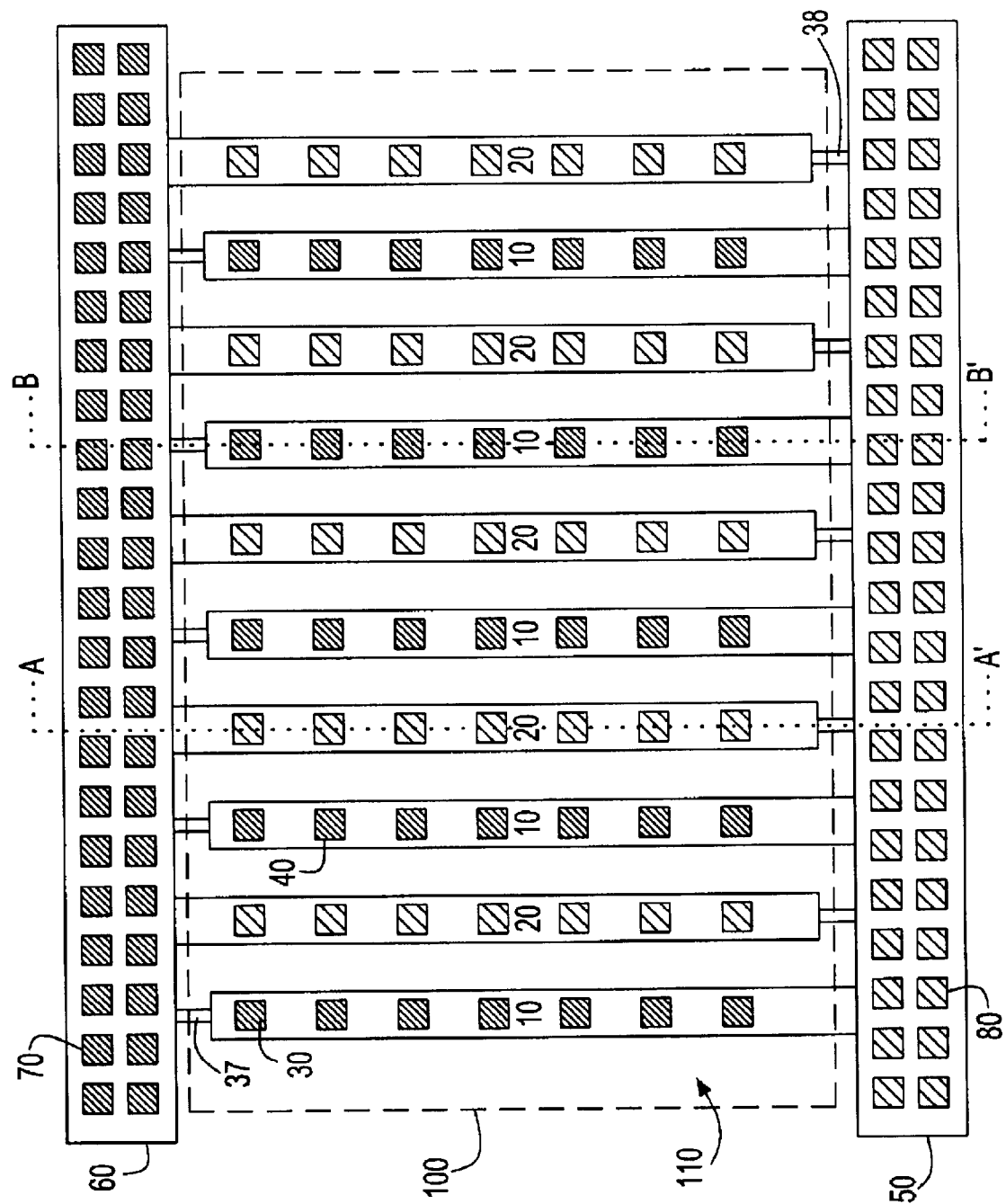
FIG. 16 is a top-down view of the device, wherein support structures are provided to the movable electrodes to reduce the actuation voltage of the device.

FIG. 16 shows a top-down layout view of the MEMS variable capacitor where the support structures 37 and 38 for the comb drive electrode 10 and 20 are used to reduce the stiffness of the electrodes. Given the width of the oxide and metal thickness in the support structure area, the mechanical stiffness of the electrodes is reduced, leading to lower actuation voltages.

Figure 17:
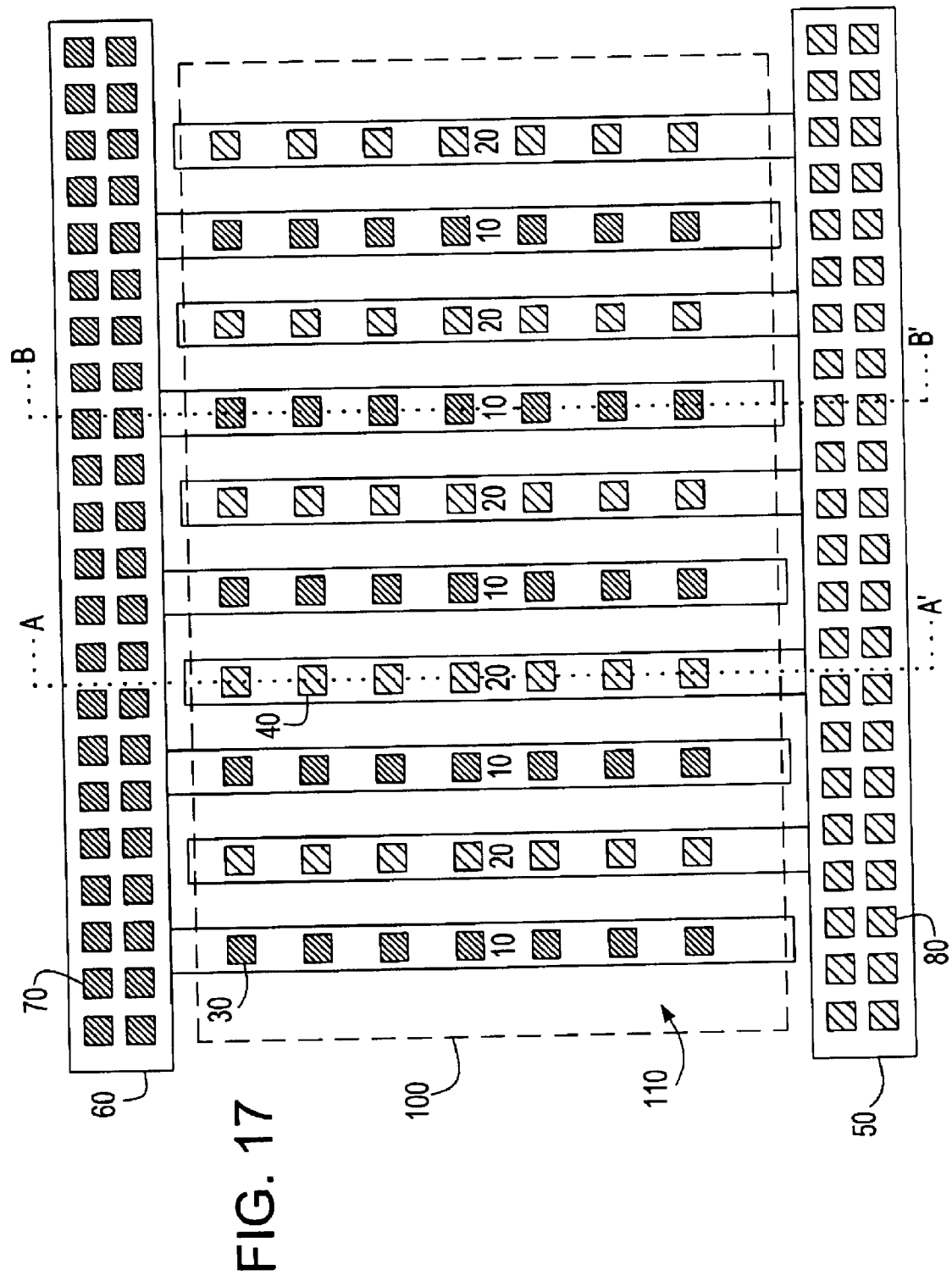
FIG. 17 shows a top-down view of the device, wherein movable electrodes are attached at both the ends resulting in movable beams in a fixed configuration.
Figure 18:
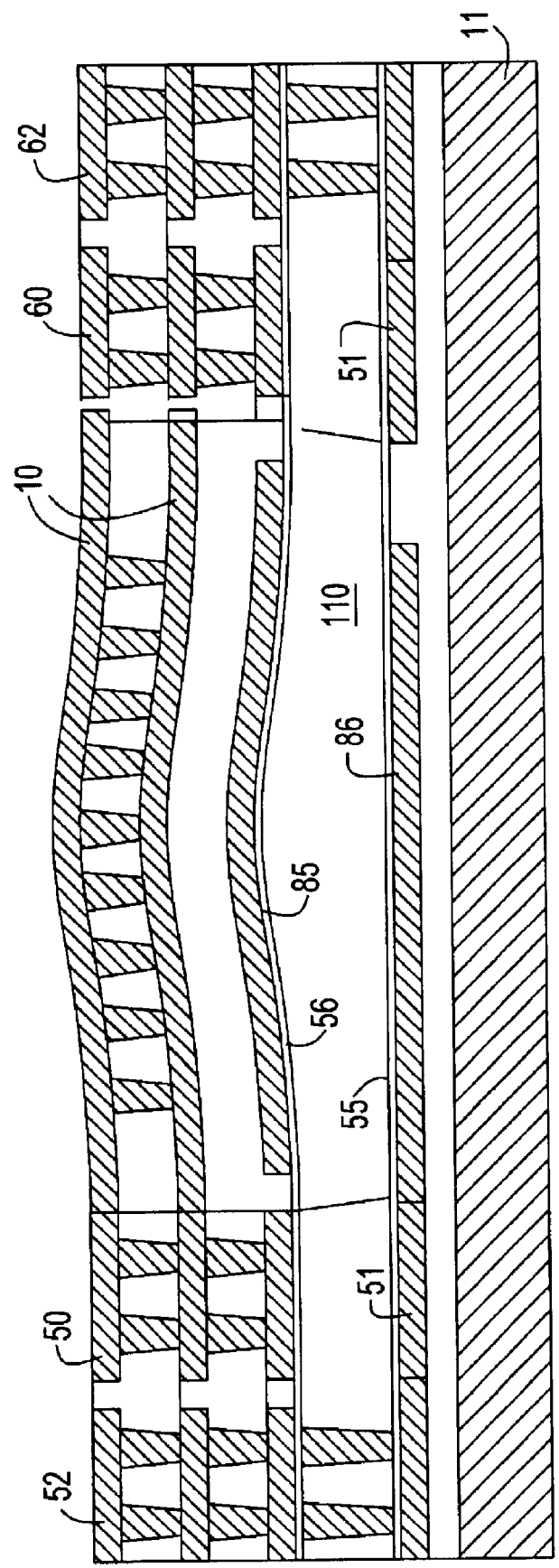
FIG. 18 shows a cross-section of the MEMS variable capacitor having fixed-fixed beam electrodes.

FIG. 17 shows another embodiment of the device structure wherein both ends of the comb drive electrode are attached to a dielectric layer, leading to movable beams in a fixed beam configuration. The mechanical stiffness of the drive electrode manufactured in this fashion is expected to be more than the electrodes fabricated in a cantilever beam fashion, as previously described. FIG. 18 is a cross-sectional view of a fixed comb-drive electrode, as seen through the section AA' of FIG. 17.

Figure 19:
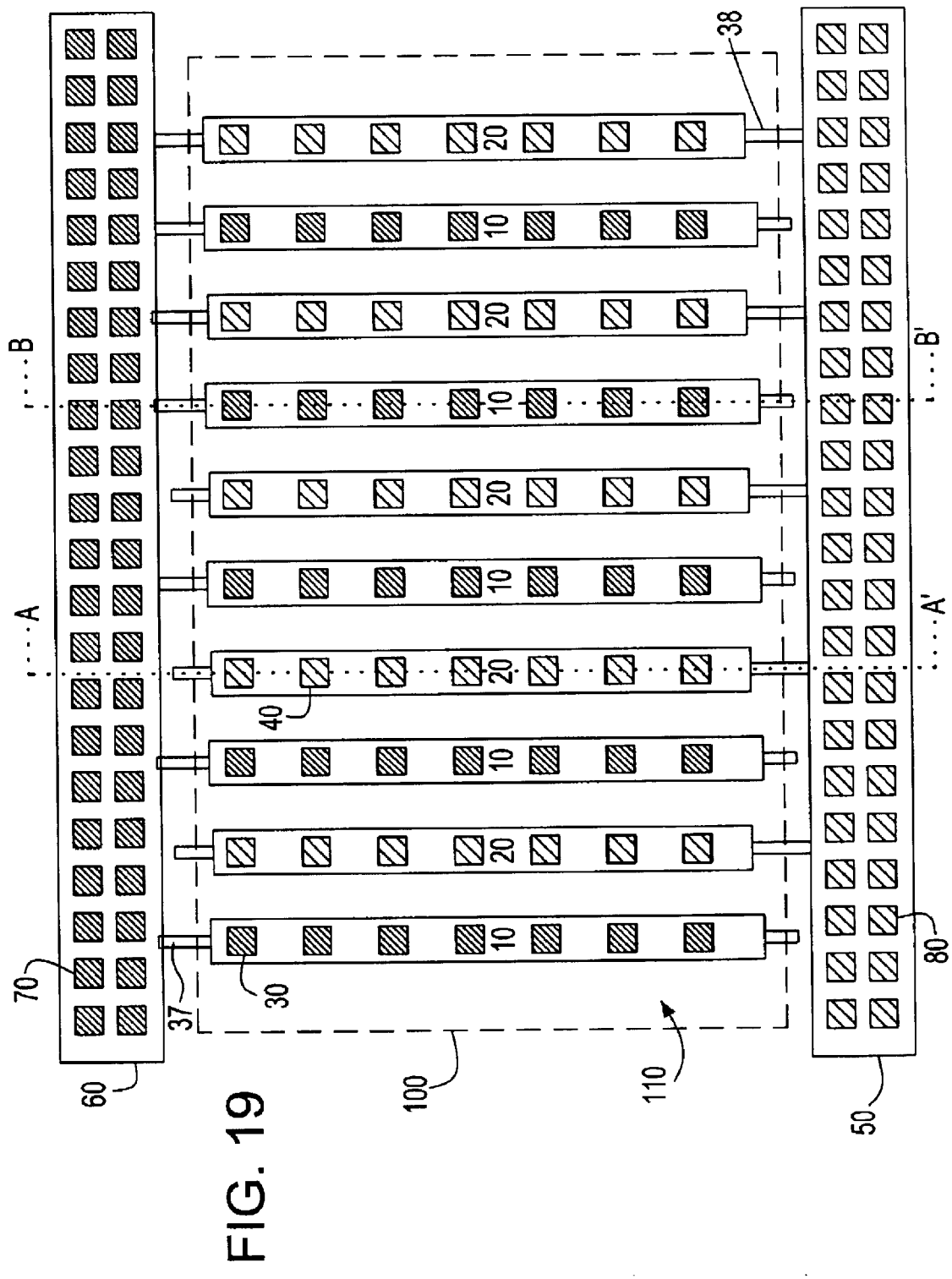
FIG. 19 shows a top-down view of the device, wherein support structures are provided to achieve fixed-fixed movable electrodes to reduce the actuation voltage of the device.
Figure 20:
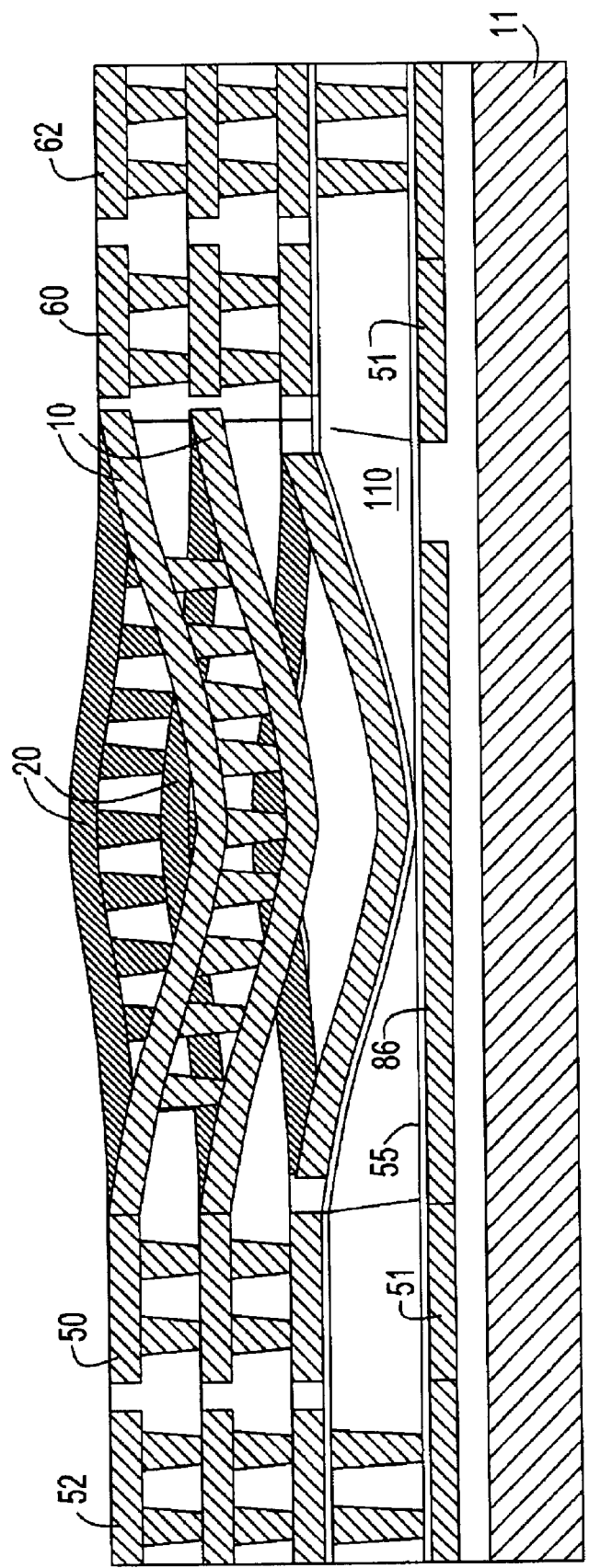
FIG. 20 is a cross-section view of the MEMS variable capacitor showing one of the electrode in the actuation state

FIG. 19 is a top-down view of the MEMS variable capacitor structure wherein the support structures 37 and 38 are used to reduce the stiffness of a fixed comb-drive electrodes 10 and 20. FIG. 20 illustrates a cross-section view of the device structure as seen through lines A–A' (FIG. 19). Therein, one electrode 10 is actuated, leading to a pull-down action of the ground electrode, while the adjacent electrode 20, with its opposite polarity is not actuated.

Figure 21:
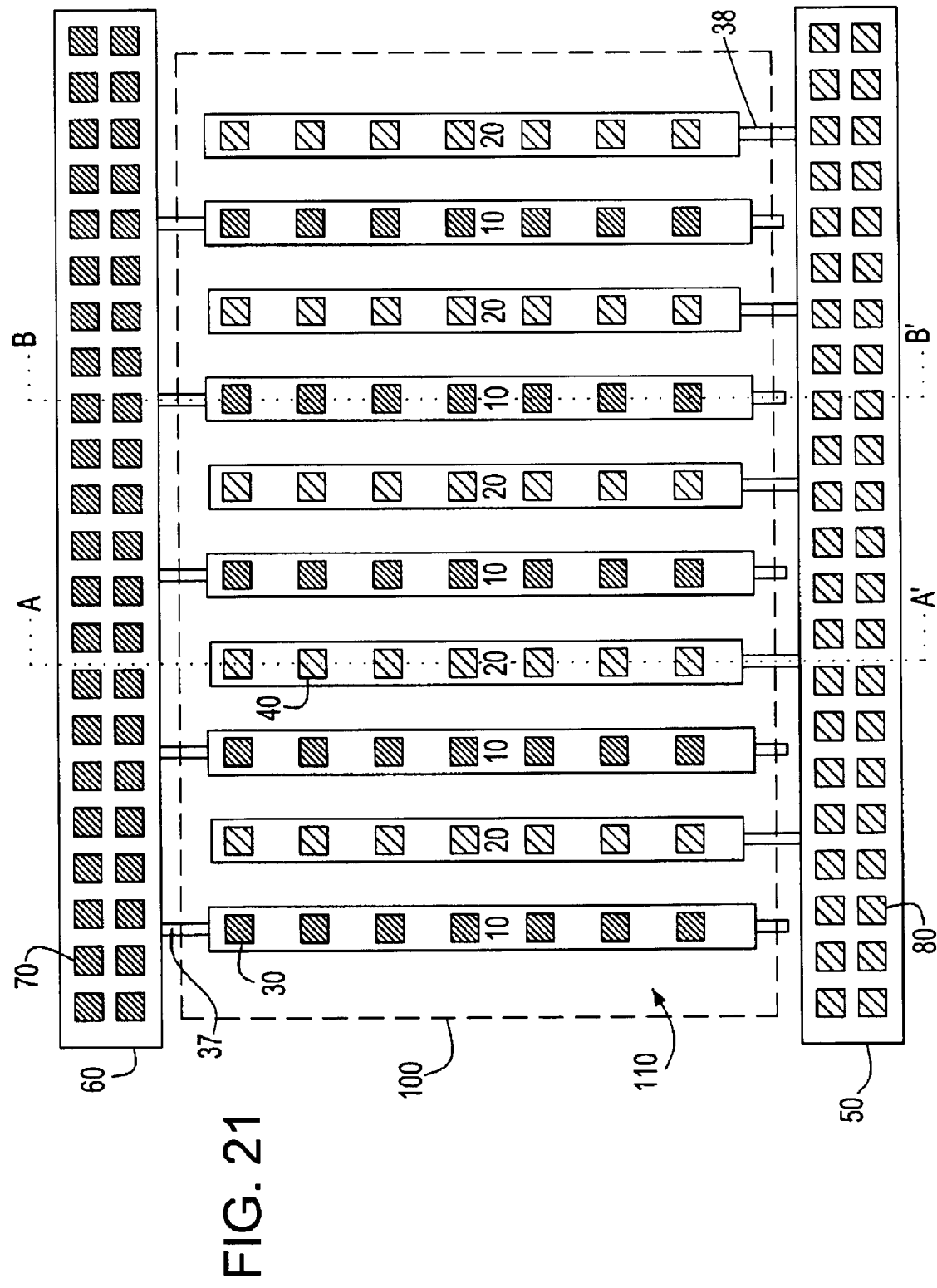
FIG. 21 shows a top-down view of the MEMS variable capacitor wherein one electrode is fabricated with both ends attached to the dielectric, while the other electrode is attached to only one end.
Figure 22:
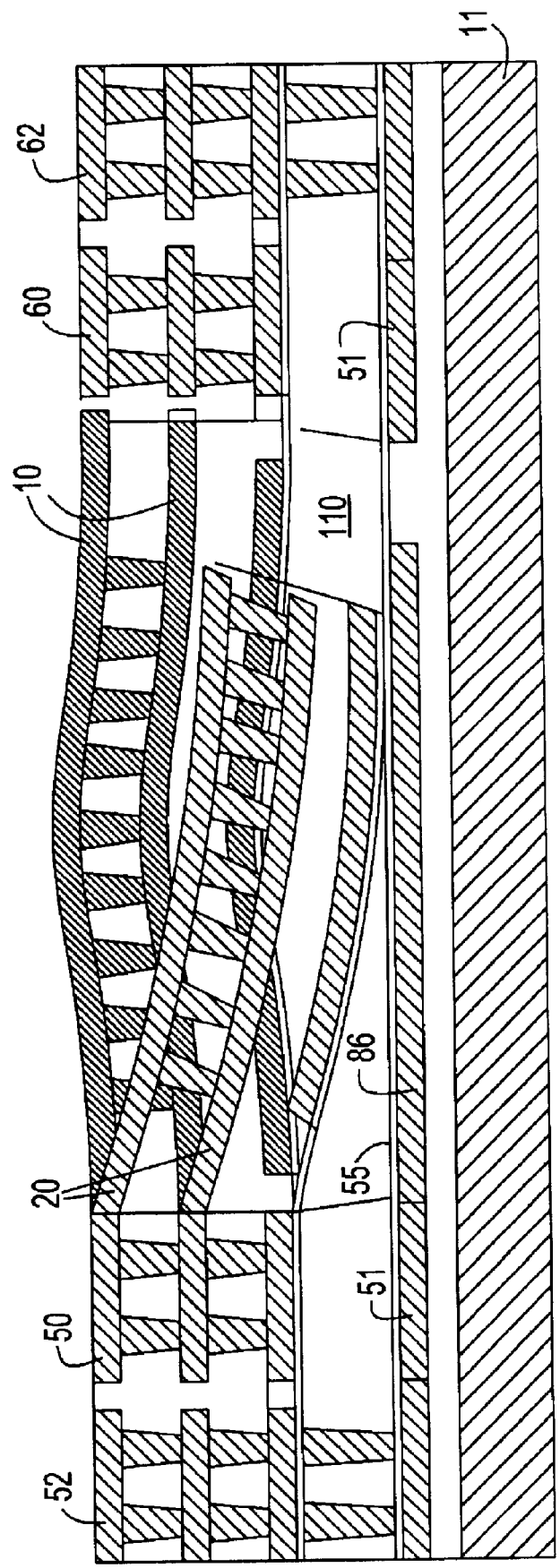
FIG. 22 shows a cross-section view of MEMS variable capacitor, with an actuated electrode attached to one end along with a non-energized fixed electrode.

FIG. 21 shows a top-down view of device structure wherein electrodes 10 of one polarity are formed in a fixed configuration, while the electrodes 20, having an opposing polarity, are attached at one end. Finally, the cross-section view of the device as seen through section A–A' (FIG. 21) is shown in FIG. 22. The state corresponding to the electrode 20 attached at one end is actuated, while the electrode 10 that is attached at both ends remains at its initial state.

While the invention has been described in conjunction with a preferred embodiment, it is to be understood that many alternatives, modifications and variations will be apparent to those skilled in the art in light of the aforementioned description. Accordingly, it is intended to embrace all such alternatives, modifications and variations which fall within the spirit and scope of the appended claims. All matters set forth herein or shown in the accompanying drawings are to be interpreted in an illustrative and non-limiting sense.

What is claimed is:

1. A micro electro-mechanical system (MEMS) variable capacitor comprising:
   a fixed electrode formed on a substrate; and
   two movable beams facing each other, each of said movable beams being respectively anchored to said substrate at at least one end thereof, said movable beams being formed by co-planar metal lines interconnected by a plurality of conductive vias, said conductive vias and said metal lines being embedded in insulating material, said movable beams further comprising a bottom electrode facing said fixed electrode, formed on the bottom surface of said insulating material, wherein the capacitance varies as a function of the sidewall overlap area of said two movable beams rotating with respect to one another.

2. The MEMS variable capacitor as recited in claim 1, wherein said fixed electrode is an actuating electrode for pulling down said movable beam.

3. The MEMS variable capacitoras recited in claim 1, wherein the material is selected from the group consisting of $SiO_2$, SiN, $Si_3N_4$, SiCOH, and SiCN.

4. The MEMS variable capacitoras recited in claim 1, wherein said electrodes are made of copper surrounded by a liner, said liner being made of a material selected from the group consisting of Ta, TaN, Ti, TiN, and W.

5. The MEMS variable capacitor as recited in claim 1, wherein said movable beams form a multi-layered metal structure.

6. The MEMS variable capacitor as recited in claim 1, wherein said via interconnections in one of said movable beams faces said via interconnections in said second movable beam for increased sidewall area and mechanical stability.

7. The MEMS variable capacitor as recited in claim 1, wherein the actuation electrodes are anchored to said substrate.

8. The MEMS variable capacitor recited in claim 1 wherein said bottom electrode is electrically insulated from said co-planar metal lines, and wherein a voltage that is applied between said fixed electrode and said bottom electrode creates an attraction force on said movable beam inducing movement.

9. The MEMS variable capacitor recited in claim 1, wherein said two movable beams form the two plates of the capacitors.

10. The MEMS variable capacitor recited in claim 1, wherein the space separating said fixed electrode from said bottom electrode is air, when said electrodes are not actuated.

11. The MEMS variable capacitor recited in claim 1, wherein said fixed electrode and said bottom electrodes are provided with an insulate layer to electrically insulating them from each other when said electrodes are actuated.

12. The MEMS variable capacitor recited in claim 1, wherein said movable electrodes are densely populated by way of said via interconnections to increase the sidewall area of said capacitor.

13. The MEMS variable capacitor recited in claim 1, wherein the number of said co-planar metal lines is maximized to increase the total capacitance of said variable capacitor.

14. A micro electro-mechanical system (MEMS) variable capacitor comprising:
   a plurality of fixed electrodes formed on a substrate parallel to each other; and
   movable beams facing each other and facing one of said fixed electrodes, each of said movable beams being respectively anchored to said substrate at at least one end thereof, said movable beams being formed by co-planar metal lines interconnected by a plurality of conductive vias, said conductive vias and said metal lines being embedded in insulating material, said movable beams further comprising a movable electrode facing said fixed electrode, formed on the bottom surface of said insulating material, wherein the capacitance varies as a function of the total sidewall overlap area of said movable beams.

15. The MEMS variable capacitor recited in claim 14, wherein alternating movable electrodes of one polarity are attached to a metal strap and the remaining movable electrodes of opposing polarity are attached to a second metal strap.

16. The MEMS variable capacitor recited in claim 14 further comprising a plurality of movable electrodes, wherein at least one of said movable electrodes provides a signal path between said at least one movable electrode and its corresponding movable beam, forming a multiple-port MEMS variable capacitor.

17. The MEMS variable capacitor recited in claim 14, wherein said movable electrodes are attached to said substrate in a plurality of configurations.

18. The MEMS variable capacitor recited in claim 14, wherein said movable electrodes attached to said substrate are connected to an actuation pad for simultaneous actuation of said movable electrodes having the same polarity.

19. The MEMS variable capacitor recited in claim 14, wherein said movable electrodes attached to said substrate are connected to separate actuation pads for an independent actuation of said movable electrodes of opposite polarity.

20. The MEMS variable capacitor recited in claim 14, wherein movable electrodes are curled up or down due to relaxation of residual stresses in said metal lines and said associated insulating material.

21. The MEMS variable capacitor recited in claim 14, wherein said movable electrodes are attached on one end leading to an electrode to form a cantilever beam.

22. The MEMS variable capacitor recited in claim 14, wherein said movable electrodes are attached on both ends to form a fixed beam.

23. The MEMS variable capacitor recited in claim 14, wherein the support structures reduce the mechanical stiffness of said movable electrodes.

24. The MEMS variable capacitor recited in claim 14, wherein a second substrate encapsulates said variable capacitor in dielectric.

25. The MEMS variable capacitor recited in claim 24, wherein said second substrate is made of inorganic material or semiconductor material.

\* \* \* \* \*